United States Patent
Fujisawa et al.

(10) Patent No.: US 7,343,789 B2
(45) Date of Patent: Mar. 18, 2008

(54) INSPECTION METHOD AND APPARATUS FOR UNEVEN MARKS ON TIRE

(75) Inventors: Yoshitaka Fujisawa, Tokorozawa (JP); Tomoyuki Kaneko, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/596,670

(22) PCT Filed: May 18, 2005

(86) PCT No.: PCT/JP2005/009073

§ 371 (c)(1), (2), (4) Date: Nov. 16, 2006

(87) PCT Pub. No.: WO2005/111540

PCT Pub. Date: Nov. 24, 2005

(65) Prior Publication Data

US 2007/0209431 A1    Sep. 13, 2007

(30) Foreign Application Priority Data

May 18, 2004    (JP)    ............... 2004-147940

(51) Int. Cl.
G01M 17/02    (2006.01)
(52) U.S. Cl. ...................... 73/146; 73/146.5
(58) Field of Classification Search ....... 73/146–146.8; 340/442–447
See application file for complete search history.

(56) References Cited

U.S. PATENT DOCUMENTS 6,539,788 B1 * 4/2003 Mancosu et al. ............. 73/146
2007/0204684 A1 * 9/2007 Muhlhoff et al. ............. 73/146

FOREIGN PATENT DOCUMENTS

| JP | 7-152860 A | 6/1995 |
| JP | 7-237270 A | 9/1995 |
| JP | 2003-240521 A | 8/2003 |

* cited by examiner

*Primary Examiner*—Edward Lefkowitz
*Assistant Examiner*—Jermaine Jenkins
(74) *Attorney, Agent, or Firm*—Sughrue Mion, PLLC

(57) ABSTRACT

There are provided an inspection method of tire uneven marks capable of judging defect of three-dimensional form of the mark in a higher reliability without depending on a brightness distribution image of unevenness, and an inspection apparatus of tire uneven marks. The inspection method of tire uneven marks comprises a step of measuring heights of unevenness inclusive of marks to be inspected with respect to each area element in a predetermined tire surface region to acquire unevenness distribution data, a step of specifying a tire surface portion corresponding to a mark model in the tire surface region from data of three-dimensional form of a mark model previously prepared as a template of the each mark and the above acquired unevenness distribution data, and a step of determining a coincidence between the unevenness distribution data of the specified tire surface portion with respect to the each mark and data of three-dimensional form of the mark model to judge an acceptance of the three-dimensional form of the mark based on the coincidence.

8 Claims, 9 Drawing Sheets

FIG. 3
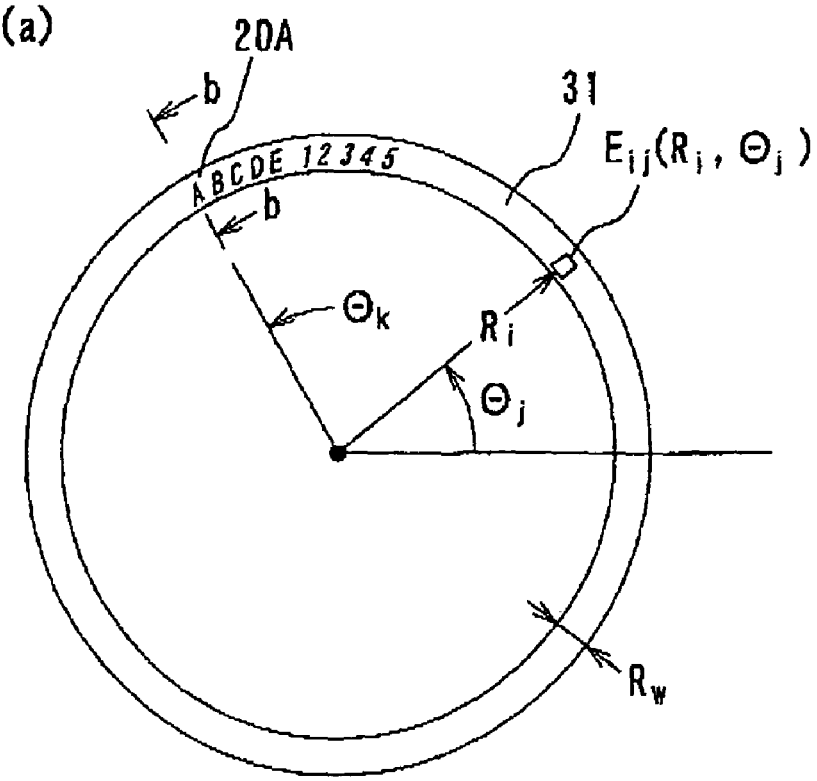
(a)
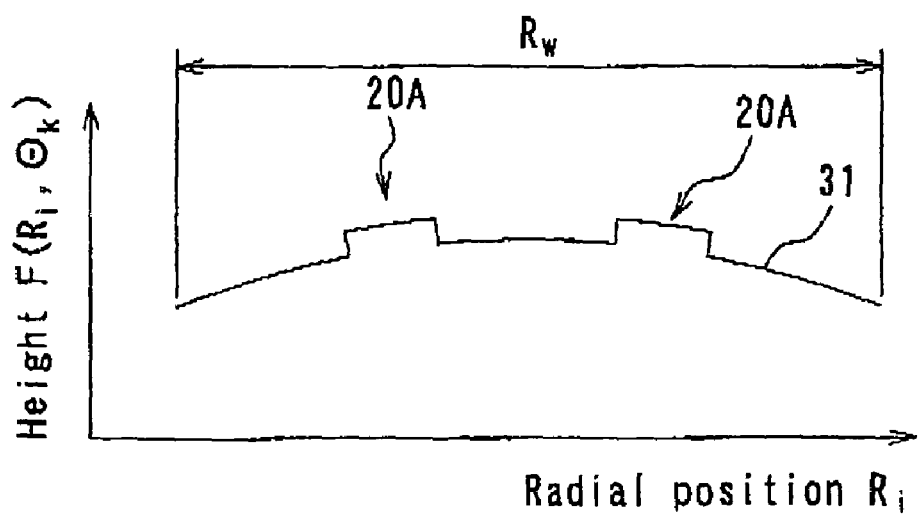
(b)

FIG. 4
(a)
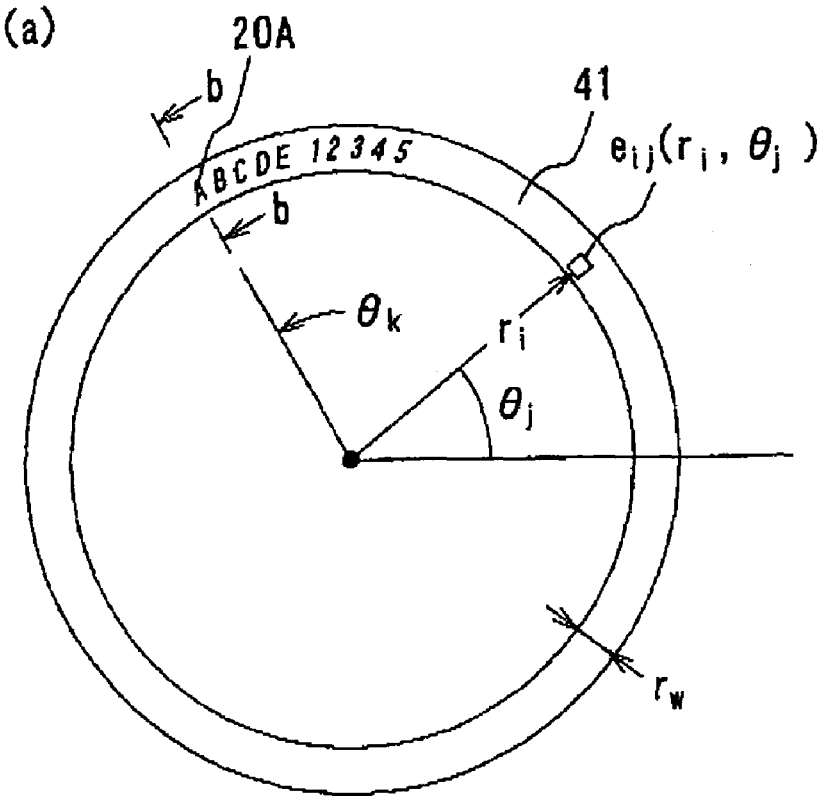
(b)
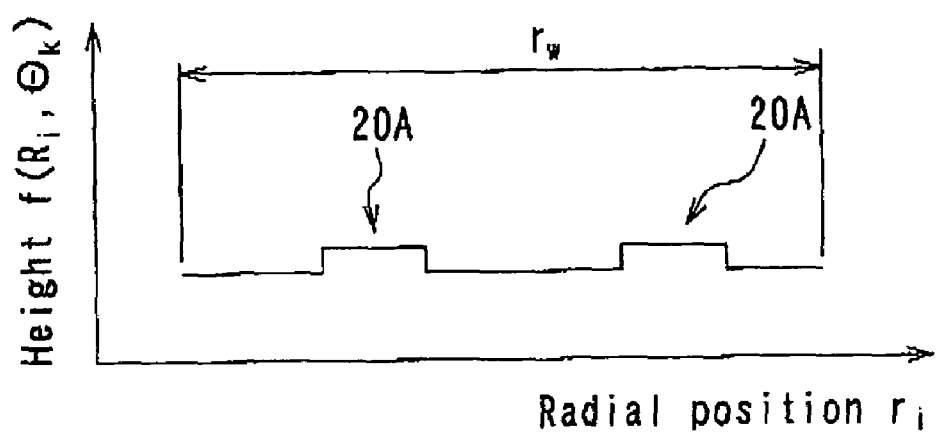

FIG. 8
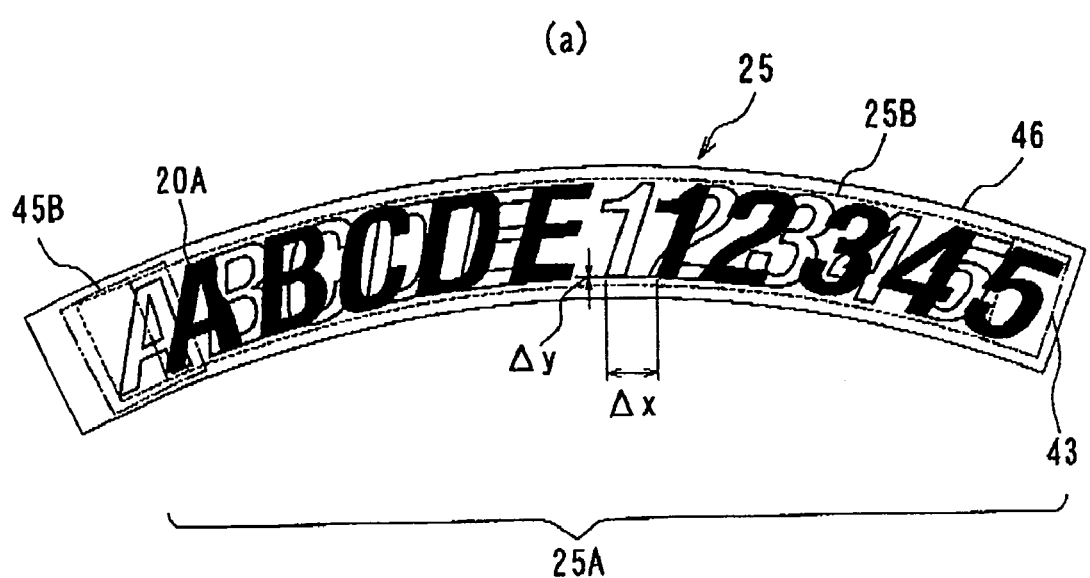
(a)
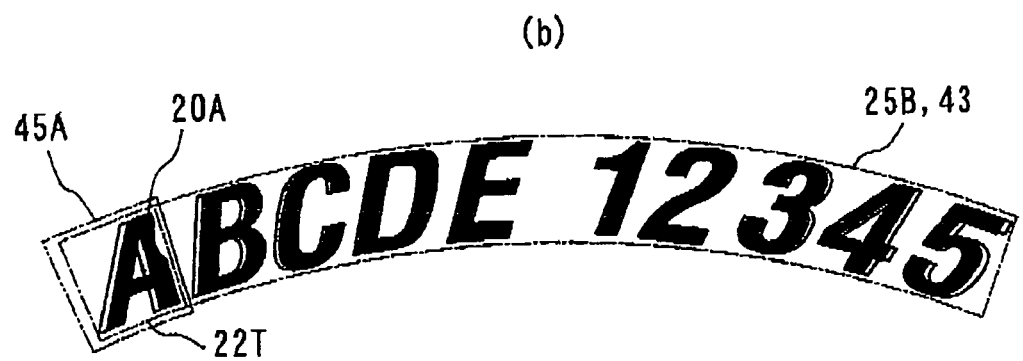
(b)

FIG. 9
(a)
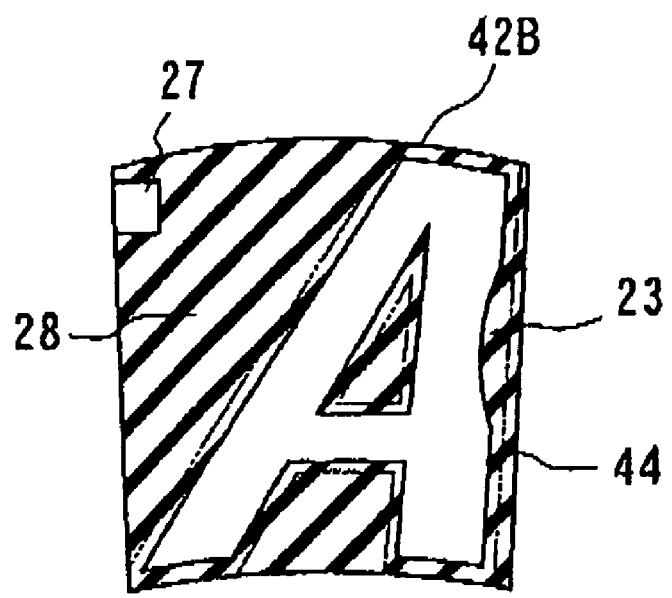
(b)
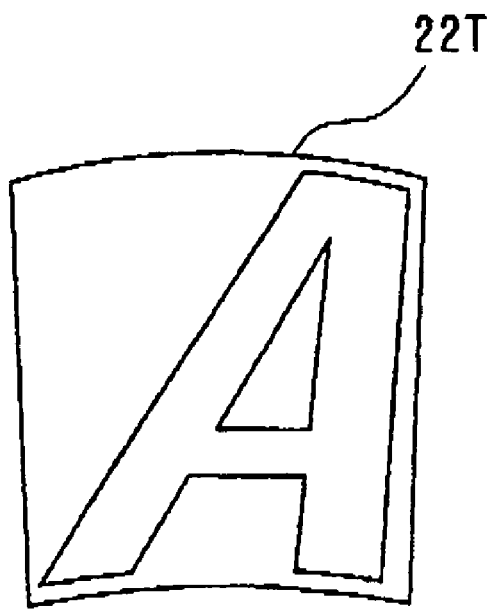

INSPECTION METHOD AND APPARATUS FOR UNEVEN MARKS ON TIRE

TECHNICAL FIELD

This invention relates to an inspection method of tire uneven marks, which inspects three-dimensional forms of one ore more marks formed through unevenness on a surface of a tire, and an inspection apparatus of tire uneven marks used therefor.

RELATED ART

As a method for automatically inspecting uneven marks such as letters and the like formed with unevenness on the surface of the tire, there is known an inspection method wherein a light is irradiated onto a sidewall of the tire provided with the uneven marks to shoot bright lines on the sidewall formed by the light with an image pickup camera and the shot image data corresponding to letters or letter row are subjected to an image processing to convert into a letter row corresponding to the uneven marks and the converted letter row is compared with a previously stored letter row to inspect whether or not the uneven marks are adequately indicated at predetermined positions as the predetermined letter row (see, for example, Patent Document 1).

Patent Document 1: JP-A-H10-115508

DISCLOSURE OF THE INVENTION

Problems to be Solved by the Invention

On the other hand, it is desired to develop a method of automatically inspecting uneven marks such as letters and the like formed with unevenness on the surface of the tire without relying on manual operation as to not only the inspection on the presence or absence of the marks and the arrangement of the marks but also the inspection on the forma of the form of the marks, i.e. the judgment of presence or absence of defects in the three-dimensional form of the mark and further the judgments of the site and degree of the form defect.

However, the aforementioned methods for inspecting the formed uneven marks such as letters and the like are carried out by subjecting the brightness image formed through the irradiation of the light to the image processing to conduct the recognition of the marks, and can judge the presence or absence of the mark at the predetermined position and hardly have a function of selecting a most similar mark from known marks when judging the presence of the mark, but can not be quite provided with a function of judging the presence or absence of the form defect or further judging the site and degree of the defect.

In the conventional method, the detection of the unevenness used in the inspection of the mark is obtained as an information of the brightness distributed image largely influenced by the delicate change of the irradiation environment such as intensity, direction or the like of the light irradiation or the delicate change of the tire surface such as gloss or surface properties, so that even if it is intended to convert this information into the three-dimensional form of the mark to judge the defect of the mark, the three-dimensional form obtained from the brightness distributed image is very low in the reliability, and it is practically impossible to conduct the judgment of the defect in the mark.

Considering the above problems, the invention is to provide an inspection method of tire uneven marks capable of judging the defect of the three-dimensional form of the mark in a higher reliability without depending on the brightness distributed image of the unevenness, and an inspection apparatus of the tire uneven marks.

Means for Solving Problems (1) The invention is a method for inspecting three-dimensional forms of one or more marks formed with unevenness on a surface of a tire, which comprises a step of measuring heights of unevenness inclusive of these marks on each area element in a predetermined tire surface region to acquire data of unevenness distribution, a step of specifying a tire surface portion corresponding to a mark model for the respective mark in the tire surface region from data of three-dimensional form of a previously prepared mark model as a mark template and the acquired data of the unevenness distribution, a step of determining a coincidence between the data of the unevenness distribution and the data of the three-dimensional form of the mark model in the specified tire surface portion on the respective mark to judge an acceptance of the three-dimensional form of the respective mark based on the coincidence.

Throughout the specification, the term "mark" means a portion representing a letter, a symbol, a picture or the like and is represented by forming unevenness on the surface to change the height of the surface and distinct from the surrounding portion.

(2) In the inspection method of the tire uneven marks according to the item (1), the step of specifying the tire surface portion of the each mark corresponding to the mark model is carried out by setting a search area in the tire surface region based on a mark arranging information previously prepared to the mark, changing a position of the tire surface portion in the search area so as to correspond with the mark model and specifying the tire surface portion corresponding to the mark model to a position that a coincidence between data of unevenness distribution in the tire surface portion calculated every position and the data of the three-dimensional form of the mark model becomes highest.

(3) In the inspection method of the tire uneven marks according to the item (1), the step of specifying the tire surface portion of the each mark corresponding to the mark model comprises a first step wherein a pat of plural marks including the mark and marks adjacent thereto is a collecting mark and a tire surface portion corresponding to a collecting mark model previously prepared as a template of the collecting mark is specified from the tire surface region based on data of three-dimensional form of the collecting mark model and the acquired data of the unevenness distribution to determine a displacement between a position of the collecting mark based on an arranging information of the collecting mark previously prepared to the collecting mark and a position of the tire surface portion specified corresponding to the collecting mark model; and a second step wherein a search area to the mark is set based on a modified information of the mark arrangement obtained by adding the above displacement to the information of the mark arrangement previously prepared to the respective mark constituting the collecting mark and a position of a tire surface portion corresponding to the mark model is changed in the search area to specify the tire surface portion corresponding to the mark model to a position that a coincidence between data of unevenness distribution in the tire surface portion calculated every position and the data of the three-dimensional form of the mark model becomes highest.

(4) In the inspection method of the tire uneven marks according to any one of the items (1)-(3), a mark model used in the step of specifying the tire surface portion of the each mark corresponding to the mark model is set as a region of a parallelogram including this mark. In this case, it need hardly be said that the parallelogram includes a rectangle or a square.

(5) In the inspection method of the tire uneven marks according to any one of the items (1)-(3), a mark model used in the step of judging the acceptance of the three-dimensional form of the mark is set as a zone including the mark and a band-shaped portion of a given width adjacent to an outside of the mark over a full length of a profile line of the mark.

(6) In the inspection method of the tire uneven marks according to any one of the items (1)-(5), the data of the three-dimensional form of the mark model on the each mark are prepared based on CAD data of the tire.

(7) In the inspection method of the tire uneven marks according to any one of the items (1)-(6), the data of the unevenness distribution is acquired by using a light cutting process at the step of measuring the heights of the unevenness on each area element in the predetermined tire surface region.

(8) The invention is further a mark inspection apparatus used In the inspection method of the tire uneven marks according to any one of the items (1)-(7), which comprises an unevenness data acquiring means for measuring the heights of the unevenness to acquire data of unevenness distribution, a mark data storing means for storing the mark arranging information to the each mark and data of three-dimensional form of the mark model, an arithmetic processing means for specifying a tire surface portion corresponding to the mark model based on the data of the unevenness distribution input from the unevenness data acquiring means and the data of the three-dimensional form of the mark model input from the mark data storing means to judge an acceptance of the three-dimensional form of the mark based on a coincidence between the data of the three-dimensional form in the specified tire surface portion and the data of the three-dimensional form of the mark model, and a result displaying means for outputting a judging result of the acceptance.

Effects of the Invention

According to the invention of the item (1), the data of the unevenness distribution on the tire surface are acquired and a tire surface portion corresponding to each mark to be inspected corresponding to a mark model as a template of the each mark is specified from the data of the unevenness distribution and an acceptance of three-dimensional form of the mark is judged based on a coincidence obtained from a matching operation between the data of the unevenness distribution of the specified portion and the data of the three-dimensional form of the mark model, so that the matching of the data of the three-dimensional form itself can be carried out, which is entirely different from the case that the three-dimensional form is judged based on the matching of the brightness data, and hence the result of judging the acceptance can be obtained in a higher reliability without being influenced by the irradiation environment of the light, the reflectance on the tire surface and the like.

According to the item (2), the search area is set based on the previously prepared mark arranging information and the tire surface portion corresponding to the mark model is searched in the search area, so that the searching range is restricted by properly setting the search area to shorten the time required for the searching and prevent the misrecognition of a similar mark apart from the mark to be specified. Also, it is possible to conduct the searching by allowing for the search range even if there is caused a somewhat displacement of the make due to the scattering of the tire production.

According to the item (3), the tire surface portion of the mark to be inspected in correspondence with the mark model is specified by the first step wherein a pat of plural marks is a collecting mark and a tire surface portion corresponding to a mark model for this collecting mark is specified to determine a displacement between a position of the collecting mark based on an information of a collecting mark arrangement previously prepared to the collecting mark and a position of the tire surface portion specified to the collecting mark model, and the second step wherein a search area for the mark is set based on a modified information of mark arrangement obtained by adding the displacement to the information of the mark arrangement previously prepared to the each mark constituting the collecting mark and a tire surface portion corresponding to the mark model is searched in the search area, so that the searching can be conducted in a higher success rate by previously specifying the surface portion corresponding to the collecting mark model at the first step even if the search area is made small as mentioned later in comparison with the case that the portion corresponding to the mark model is separately searched without the first step, whereby the search area is made considerably small, which can more contribute to the shortening of the searching time and the prevention of the misrecognition.

According to the item (4), the mark model used in the step of specifying the tire surface portion corresponding to the mark model for the each mark is set as a region of a parallelogram including such a mark, so that the region corresponding to this mark model can be represented by an area element number in each direction of two crossing axes, and the range selecting the tire surface portion corresponding to the mark model can be defined only by the area element number and central position of the tire surface portion, whereby the processing at this step can be simplified.

According to the item (5), the mark model used in the step of judging the acceptance of the three-dimensional form of the mark is set as a zone including the mark and a band-shaped portion of a given width adjacent to the outside of the mark over a full length of a profile line of the mark, so that even if a marking is existent around the mark or another mark is adjacent to the mark, the more adequate judgment can be conducted irrespectively of them. In contrast with the case that the mark model is a wide region including the mark, for example, the region of the parallelogram including the mark, it is needless to conduct the matching between the data of unevenness distribution including the marking portion around the mark or a part of another mark and the data of the three-dimensional form of the mark model not including them, whereby the misrecognition due to the inconsistency resulted from the presence or absence of the marking portion and the part of another mark can be prevented.

According to the item (6), the data of the three-dimensional form of the mark model for the each mark are prepared based on CAD data of the tire, so that it is not required to newly prepare data for the inspection and the preparation of the data of the three-dimensional form of the mark model can be made more efficient only by exchanging data of product specification for the tires.

According to the item (7), the data of the unevenness distribution are acquired by using the light cutting process, so that the unevenness distribution data truly representing the unevenness on the profile of the tire can be easily obtained.

According to the item (8), the apparatus comprises the unevenness data acquiring means for measuring the heights of the unevenness to acquire data of unevenness distribution, the mark model data storing means for storing the data of three-dimensional form of the mark model, the arithmetic processing means for specifying a tire surface portion corresponding to the mark model for the mark to judge an acceptance of the three-dimensional form of the mark, and the result displaying means for outputting a judging result of the acceptance, so that the matching of the three-dimensional form data themselves can be carried out as mentioned above and also the judging result of the acceptance can be obtained in a higher reliability.

BRIEF DESCRIPTION OF THE DRAWINGS

FIG. 3 is a plan view and a section view showing data of a primary unevenness distribution as a tire surface pictured based on such data, respectively;

FIG. 4 is a plan view and a section view showing data of a secondary unevenness distribution as a tire surface pictured based on such data, respectively;

FIG. 8 is a schematic view showing a collecting mark model and a search area to a mark in the collecting mark; and FIG. 9 is a view explaining a problem when a first mark model is used in the calculation of a coincidence.

BEST MODE FOR CARRYING OUT THE INVENTION

Figure 1:
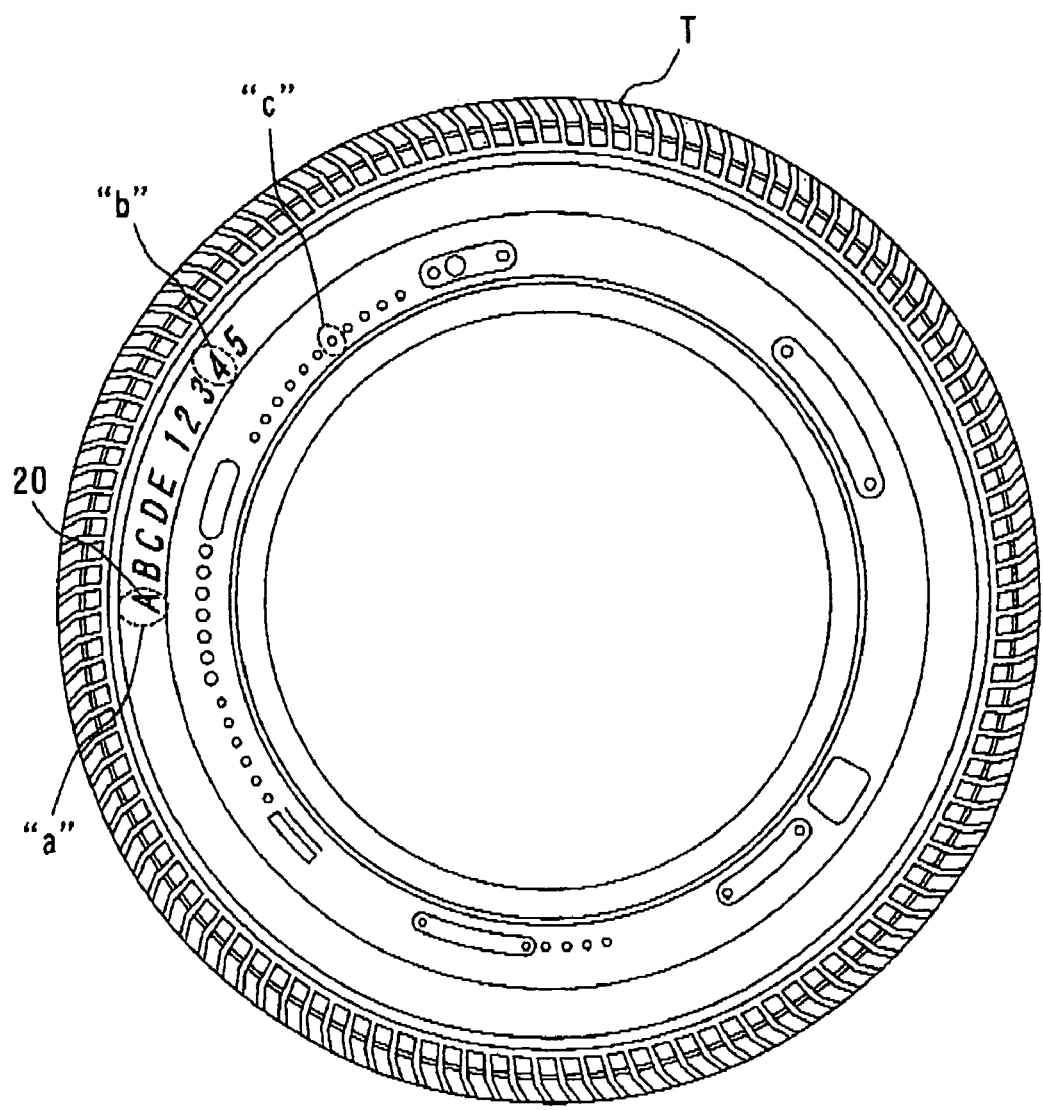
FIG. 1 is a front view diagrammatically showing a sidewall surface of a tire T provided with plural marks formed through unevenness.

An embodiment of the invention will be explained with reference to the drawings. FIG. 1 is a front view diagrammatically showing a sidewall surface of a tire T provided with plural marks formed through unevenness. The following explanation is carried out by taking a case that a three-dimensional form of a mark 20 shown in "a" portion is inspected as an example. Moreover, marks other than "a" portion, for example, marks shown in "b" and "c" portions can be inspected in the same manner as in the "a" portion.

Figure 2:
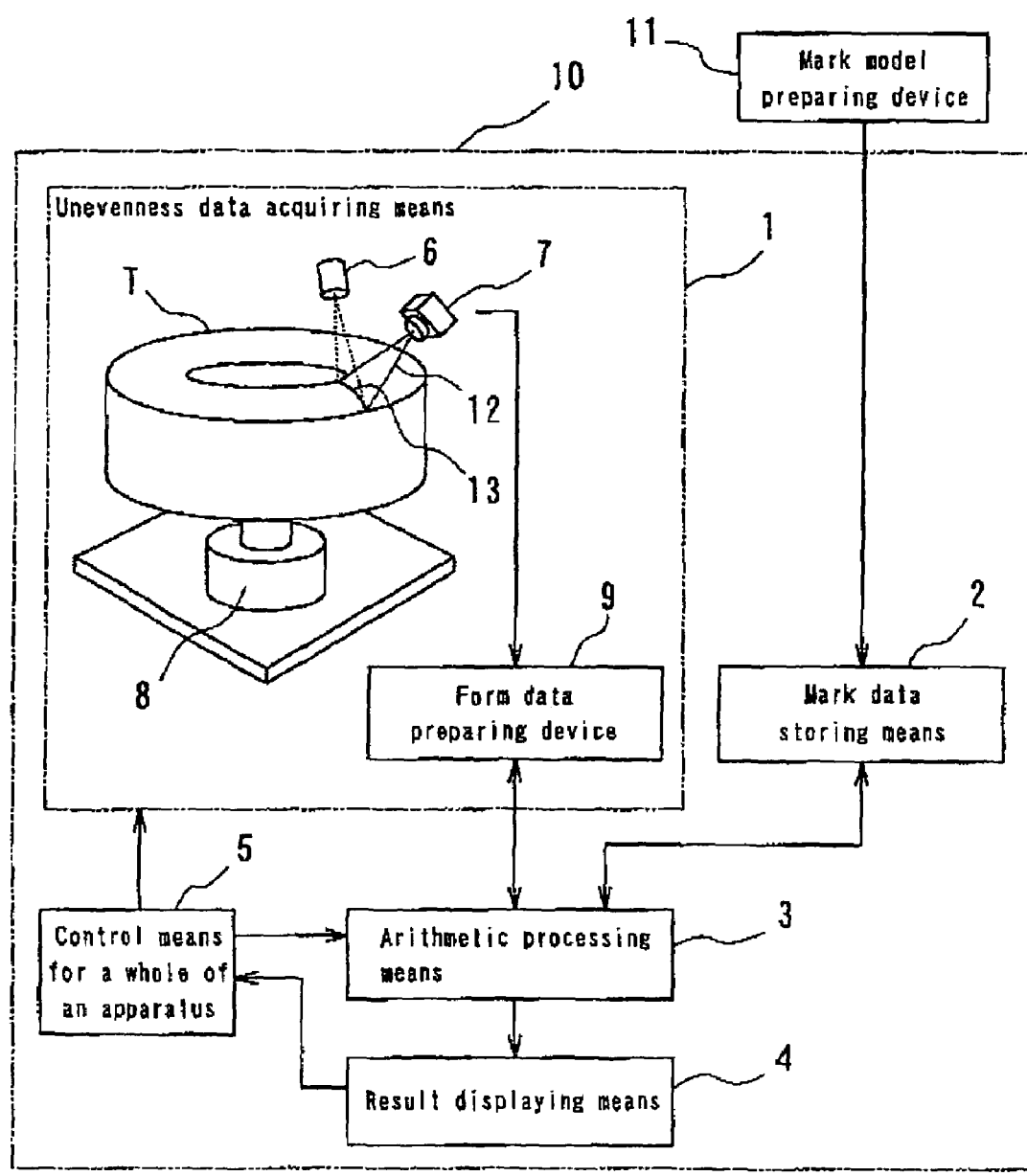
FIG. 2 is a configuration view of an inspection apparatus for tire uneven marks according to an embodiment of the invention.

FIG. 2 is a configuration view of an inspection apparatus of tire uneven marks used in the inspection of a three-dimensional form of a mark. The inspection apparatus 10 of tire uneven marks comprises an unevenness data acquiring means 1 for acquiring data of unevenness distribution in a predetermined tire surface region including the mark 20, a mark data storing means 2 for storing a mark arranging information to each mark inclusive of the mark 20 and data of a three-dimensional form of a mark model as a template of the mark, an arithmetic processing means 3 for specifying a tire surface portion corresponding to the mark model based on the data of unevenness distribution input from the unevenness data acquiring means 1 and the data of the three-dimensional form of the mark model input from the mark data storing means 2 and judging the acceptance of the three-dimensional form of the mark based on the coincidence between the data of the unevenness distribution in the specified tire surface portion and the data of the three-dimensional form of the mark model, a result displaying means 4 for outputting the judged result of the acceptance, and a control means 5 for a whole of the apparatus controlling these means.

The unevenness data acquiring means 1 is constituted with a semiconductor laser 6 radiating a fan-like spreading plane beam (sheet light) 12, a two-dimensional camera 7 shooting a bright line 13 formed on the sidewall surface of the tire T through the sheet light 12, a driving device 8 for the rotation of the tire rotating the tire at a predetermined rotating speed or feeding the tire at a predetermined pitch in a circumferential direction, and a form data preparing device 9 wherein image data shot by the camera 7 every a predetermined interval in the circumferential direction of the tire are input to extract only the bright line 13 from these images and the data of three-dimensional unevenness distribution are prepared over a whole of an annular tire surface region based on these bright lines 13.

A method wherein the sheet light is irradiated to a delivering work to gather images of the bright line formed on the work to thereby prepare a profile of the work (data of three-dimensional form) is generally called as a light cutting process. In the embodiment of the invention, the unevenness data acquiring means 1 is preferable to acquire the above data of the unevenness distribution using the light cutting process. By using the light cutting process can be directly acquired the data of the three-dimensional form from the shot images in a higher precision.

The data of the three-dimensional unevenness distribution first prepared from the image data of the camera 7 represent the profile of the actual tire surface itself, and are data to marks arranged on a convexly curved sidewall surface at a section in a radial direction of the tire. The form data preparing device 9 conducts a pre-treatment for converting the data of the three-dimensional unevenness distribution into data of three-dimensional unevenness distribution assuming that the sidewall surface is a plane against the matching treatment mentioned later. In the following explanation, the data before the pre-treatment are called as primary unevenness distribution data, and the data after the pre-treatment are called as secondary unevenness distribution data, if necessary.

FIG. 3 is a view showing the primary unevenness distribution data as a tire surface pictured based on such data, in which FIG. 3(a) a plane view and FIG. 3(b) is a section view corresponding to a b-b arrow. Also, FIG. 4 is a view showing the secondary unevenness distribution data as a tire surface pictured based on such data, in which FIG. 4(a) a plane view and FIG. 4(b) is a section view corresponding to a b-b arrow.

When polar coordinates originating a center axis of the tire are a coordination system, the primary unevenness distribution data are represented as a height distribution F $(R_i, \Theta_j)$ to each area element every an area element $E_{ij}$ $(R_i, \Theta_j)$ in a predetermined region of the tire surface at a position represented by a coordinate $(R_i, \Theta_j)$. Similarly, the secondary unevenness distribution data prepared by subjecting the primary unevenness distribution data to the above pre-treatment are represented as a height distribution f $(r_i, \theta_j)$ to each area element every an area element $e_{ij}$ $(r_i, \theta_j)$ in a predetermined region of the tire surface at a position represented by a coordinate $(r_i, \theta_j)$.

At this moment, when the whole region of the circular ring region 31 or 41 is divided into the respective area elements and the number of elements in the radial direction is N and the number of the elements in the circumferential direction is M, i is an integer of 1–N and j is an integer of 1–M. Therefore, the secondary unevenness distribution data are represented as a collection of data $e_{ij}$ $(r_i, \theta_j)$ (provided that i=1–N, j=1–M). In this case, the start position of the division in the circumferential direction, i.e. circumferential position $\theta_1$ can be corresponded to the previously prepared mark arranging information by setting based on a given marking or the like disposed on the tire surface.

The difference between the primary unevenness distribution data and the secondary unevenness distribution data is concretely represented by the example shown in FIGS. 3(b) and 4(b), in which a mark 20A formed on the tire surface with unevenness as the mark 20 indicating a letter "A" appears in FIG. 3(b) as a protruding portion having a curved face substantially parallel to a convex curved face constituting the circular ring region 31 and appears in FIG. 4(b) as a flat portion protruded on a plane constituting the circular ring region 41. Also, the width of the circular ring region of the tire surface appears in FIG. 3(b) as $R_w$ and appears in FIG. 4(b) as $r_w$ wider than $R_w$.

Figure 5:
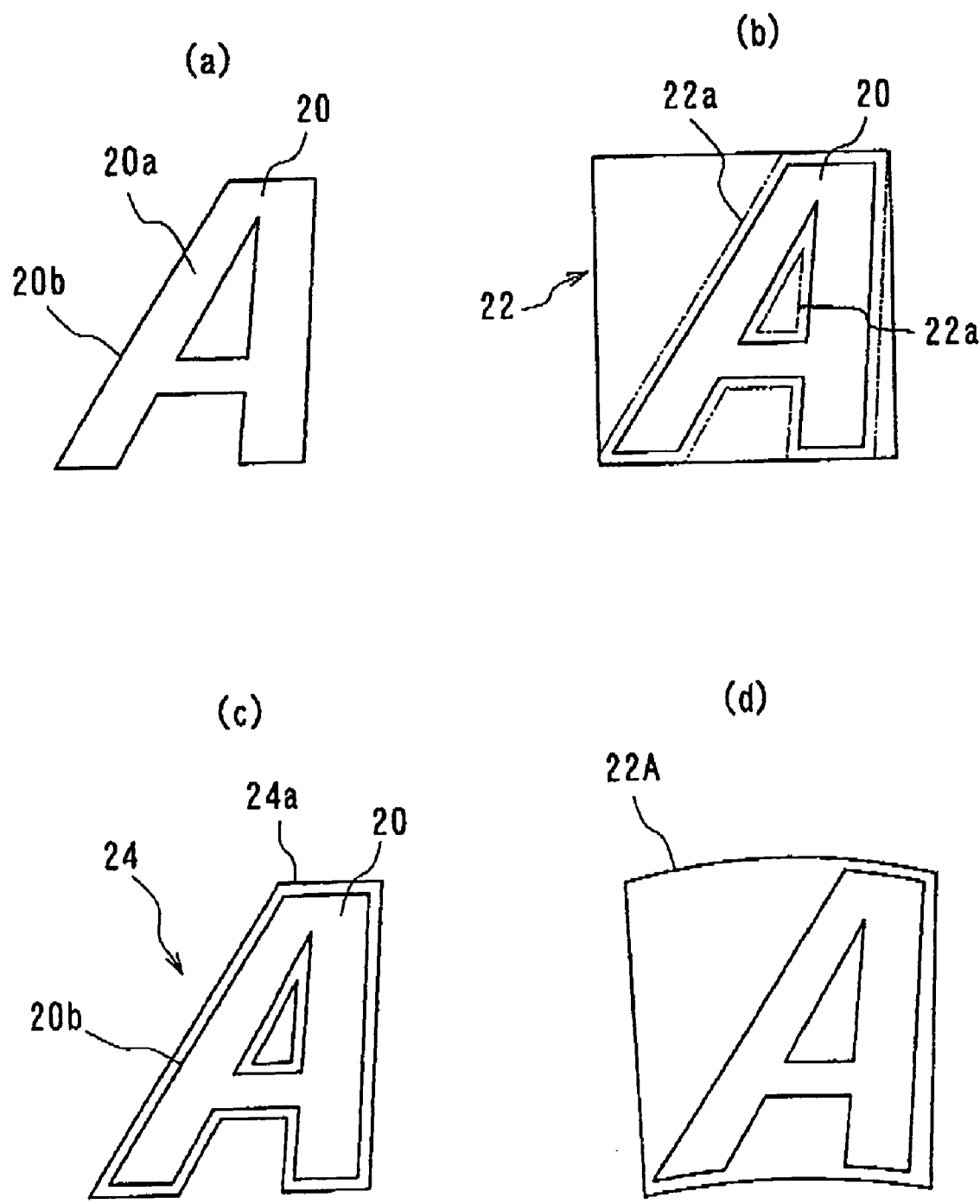
FIG. 5 is a schematic diagram explaining a difference between a mark and a mark model.

Next, the mark model stored in the mark data storing means 2 will be described. FIG. 5 is a schematic diagram explaining a difference between a mark and a mark model, in which FIG. 5(a) is a view showing the mark 20 and FIG. 5(b) is a view showing a mark model corresponding to the mark 20. The mark 20 shows a letter "A" in this embodiment. That is, the mark means a portion to be inspected and is a combination of a profile line 20b and an inside part 20a defined by the profile line 20b, while the mark model is a tool checking the secondary unevenness distribution data as a template of the mark and is defined as a collection of three-dimensional data including the mark. FIG. 5(b) shows a case that a rectangular region including the mark 20 and the surrounding thereof is a mark model 22, and FIG. 5(c) shows a case that a region consisting of the mark 20 and a band-shaped portion 24a of a given width adjacent to the outside of the mark 20 over a full length of a profile line 20b of the mark 20 is a mark model 24.

Moreover, the mark model should target the whole of the mark including the profile line when it is checked with the secondary unevenness distribution data, so that it is required to be a region including a range at least enlarging the profile line of the mark by the predetermined width. In FIG. 5(b), the band-shaped portion 22a corresponds to the enlarged range, so that the mark model 22 is set as the rectangular region enclosing the band-shaped portion 22a.

In this embodiment, the mark models 22 and 24 are selected in accordance with the purpose of the matching treatment mentioned later, so that the mark model 22 is called as a first mark model and the mark model 24 is called as a second mark model for convenience of explanation.

Also, the uneven mark 20A acquired as the secondary unevenness distribution data and actually formed on the tire has a shape that an outer portion in the radial direction of the tire is elongated as compared with an inner portion at the outside in the radial direction with respect to the mark 20 appearing in the mark models 22, 24, so that it is required to adjust the size of the mark model by deforming into a fan-like form in accordance with the surface portion corresponding thereto when the surface portion corresponding to the mark models 22, 24 is searched or when the judgment of the acceptance of the mark is conducted. For this end, the searching or the judgment of the acceptance is carried out by using a modified mark model after the mark models 22, 24 are subjected to a conversion of polar coordinates or a size conversion. FIG. 5(d) shows a mark model 22T after the mark model 22 is subjected to the conversion of polar coordinates.

The mark data storing means 2 stores a mark arrangement information corresponding to the mark in addition to the mark models 22, 24 with respect to each size of tires to be inspected. The mark arrangement information gathers specifications on the center position of the mark in the circular ring tire surface region 41 shown in FIG. 4. For example, the mark arrangement information to the mark 20 stores an appropriate center position of the mark 20 as data represented by the aforementioned coordinate $(r_i, \theta_j)$.

Further, the data of the three-dimensional form in the aforementioned mark models 22, 24 can be prepared based on the CAD data of the tire. In FIG. 12, numeral 11 is a mark model preparing device for preparing the mark model from the CAD data of the tire.

Figure 6:
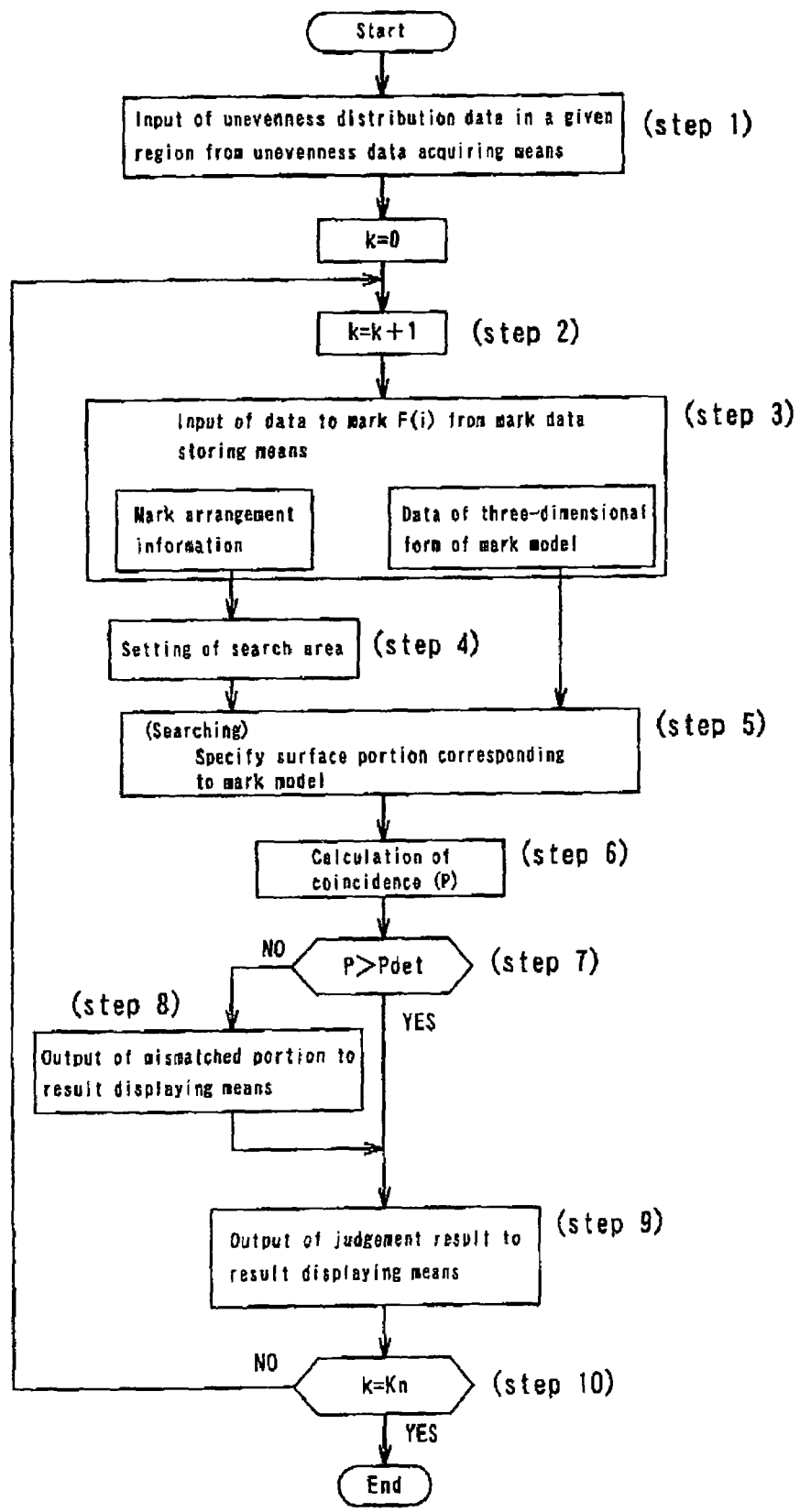
FIG. 6 is a flow chart showing a process of an arithmetic processing means.

The arithmetic processing means 3 will be described below. FIG. 6 is a flow chart showing a process through the arithmetic processing means 3. The arithmetic processing means 3 judges the acceptance of the three-dimensional form with respect to $K_n$ marks $F(1)$–$F(K_n)$. At first, the input of the secondary unevenness distribution data is carried out from the unevenness data acquiring means 1 over a whole of the circular ring region 41 based on the command of the control device 5 of the whole of the apparatus (step 1).

At the next (step 2), the mark to be inspected is set to a first F(1), and the data to the mark F(1) is input at (step 3) from the mark data storing means 2. Such data include the mark arrangement information and data of three-dimensional form of the mark model, in which the mark arrangement information is used in the setting of the search area at (step 4) and the data of the three-dimensional form of the mark model are used in the searching of (step 5).

After the setting of the search area at (step 4), the position of the surface portion corresponding to the mark model is changed in the search area at (step 5) to specify a surface portion corresponding to the mark model at such a position that a coincidence between the secondary unevenness distribution data of the surface portion and the data of the three-dimensional form of the mark model is highest. Such a procedure is called as a searching.

After (step 5), the coincidence between the secondary unevenness distribution data of the specified surface portion corresponding to the mark model and the data of the three-dimensional form of the mark model is calculated at (step 6). This means that the recalculation of the coincidence is carried out by using a second mark model for enhancing the accuracy of the coincidence.

Then, the coincidence determined by the calculation is judged at (step 7), and the result of judging an acceptance is output to a displaying means at (step 9). If the coincidence (P) is not more than a predetermined threshold value Pdet, a mismatched portion is taken out and output to the displaying means. Such an operation is conducted to all marks to be inspected, and after the completion of the operation to all marks, the arithmetic processing means 4 is ended.

Among the aforementioned steps, some of main steps will be described in detail below. As regards (step 4), the search area is first set as an area widened by a predetermined difference $\Delta r$, $\Delta \theta$ to a range of a mark model 22T arranged in a center position of a mark arrangement information based on the mark arrangement information showing an appropriate center position of the mark 20.

Figure 7:
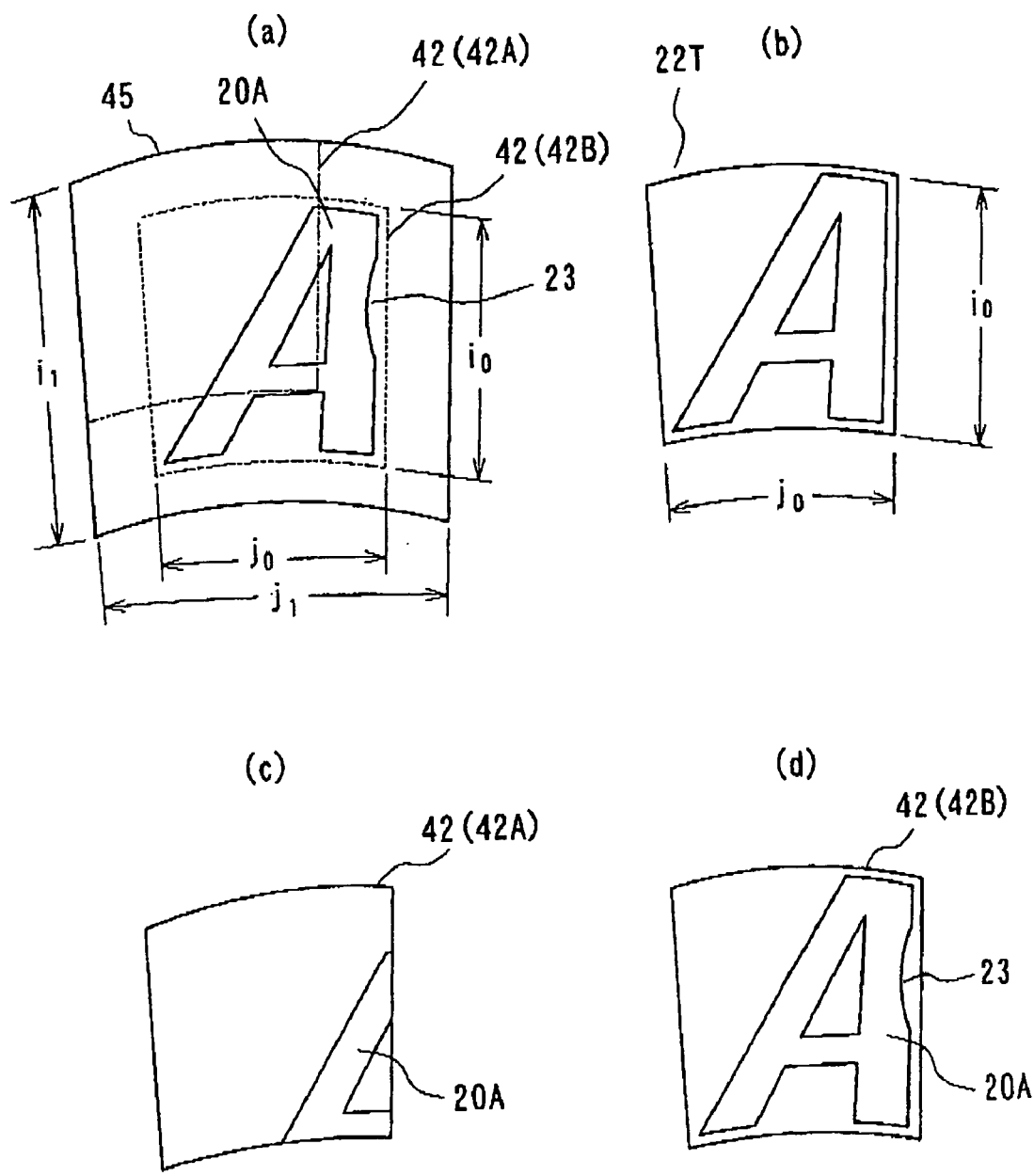
FIG. 7 is a schematic diagram showing a mark model and a search area searching a surface portion corresponding to the mark model.

Then, the searching at (step 5) is described with reference to FIG. 7. FIG. 7(a) shows a search area 45 corresponding to the mark 20 indicating a letter "A", and FIG. 7(b) shows a converted mark model 22T corresponding to the mark 20 as previously shown in FIG. 5(d), which is the same scale as the search area of FIG. 7(a). When the size of the converted mark model 22T represented by the number of area elements is $i_0$ in r-direction and $j_0$ in θ-direction, the search area 45 has such a size that the area elements of $i_1$ larger by $\Delta i_1$ and $j_1$ larger by $\Delta j_1$ are arranged in r-direction and θ-direction in correspondence with the predetermined difference $\Delta r$, $\Delta \theta$.

In the searching, a tire surface portion 42 having the size corresponding to the converted mark model 22T, i.e. area elements of i0 in r-direction and j0 in θ-direction is selected in turn from the search area 45 to determine the coincidence between the secondary unevenness distribution data of the respective tire surface portion 42 and the data of the three-dimensional form of the converted mark model 22T. Then, the coincidence is determined to all surface portions in the search area 45 to specify a surface portion located at a position corresponding to the highest coincidence as a surface portion corresponding to the converted mark model 22T. Moreover, the number of the tire surface portions 42 changed in the search area 45 is ($\Delta i_1 \times \Delta j_1$) when the tire surface portion 42 is changed every unit area element in the redirection and θ-direction, but if it is intended to shorten the tire required for this processing, the changing number is sufficient to be an integral multiplication of the unit area element.

In FIG. 7(a), 42A is a firstly selected tire surface portion, and 42B is a tire surface portion having a highest coincidence, and FIG. 7(c) is a view shown by taking out only the surface portion 42A and FIG. 7(d) is a view shown by taking out only the surface portion 42B. When FIG. 7(b) is compared with FIG. 7(c), the coincidence between the secondary unevenness distribution data of the tire surface portion 42A and the data of the three-dimensional form of the converted mark model 22T is low, while when FIG. 7(b) is compared with FIG. 7(d), the secondary unevenness distribution data of the tire surface portion 42A are coincident with the data of the three-dimensional form of the converted mark model 22T except for the defect portion 23 of the mark 20A, and the coincidence is highest.

At this moment, it is preferable to evaluate the coincidence by using an indicator that as the coincidence between the unevenness distribution data of the tire surface portion 42 and the data of the three-dimensional form of the mark model, the numerical value is highest when the two kinds of the data are completely coincident with each other and the numerical value becomes low when these data are not coincident completely. As a preferable example of the indicator used in t he coincidence can be used P(f, g) represented by the following equation (1).

(式1を入れる)　　　　　　　　　　　(Equation 1)

As seen from the above, the reason why the first mark model 22 is used as a mark model used in the searching is due to the fact that the region of the mark model 22 can be represented by the area element number in redirection and θ-direction and the tire surface portion 42 corresponding thereto can be simply selected only by designating the central coordinate and area element number in the selection of the surface portion 42. If a second mark model 24 is used as a mark model in this searching, the form of the surface portion 42 corresponding thereto becomes complicated and the searching becomes complicated.

In the searching, when the search area is made narrow, the searching is simple but also the misrecognition resulted from the interference with the adjoining mark becomes less, but the probability of deviating the actual mark on the tire surface from the search area inversely increases. The deviation of the mark from the search area is based on the displacement of the mark due to the scattering of the tire production. In many cases, a lump such as letter row, collecting mark or the like deviates as shown in FIG. 8(a). As a countermeasure, therefore, when the mutual arrangement of plural marks such as marks indicating the letter row and the like is fixed, the search area can be set small by taking a pad of these marks as a collecting mark without increasing the probability of searching failure. This method will be described in detail with reference to an example that a letter "A" is a mark to be inspected and a letter row "ABCDE 12345" is a collecting mark below.

As a pre-stage for the searching by this method, a collecting mark model previously prepared as a template of the collecting mark and an information of a collecting mark arrangement are prepared in addition to a mark model corresponding to each mark constituting the collecting mark and an arrangement information of such a mark, and these information are stored in the mark data storing means 2. In the preparation of the collecting mark model and the arrangement information of the collecting mark, the collecting mark is regarded as a mark and the preparation can be conducted by the same method as described on the mark.

As the first step, a tire surface portion corresponding to the collecting mark model is specified in the tire surface region based on the data of the three-dimensional form of the collecting mark model taken out from the mark data storing means 2 and the above acquired unevenness distribution data to determine the displacement between the position of the collecting mark based on the arrangement information of the collecting mark taken out from the mark data storing means 2 and the position of the specified tire surface portion corresponding to the collecting mark model. As the second step, the search area corresponding to the each mark constituting the collecting mark is set based on a modified mark arrangement information obtained by adding the displacement to the mark arrangement information previously prepared, and the position of the tire surface portion corresponding to the mark model is changed in the search area to specify a tire surface portion located at a position that the coincidence between the unevenness distribution data of the tire surface portion calculated every position and the data of the three-dimensional form of the mark model becomes highest as a tire surface portion corresponding to the mark model.

This treatment will be described more concretely with reference to FIG. 8. FIG. 8(a) is a view explaining the treatment of the first step, in which a portion representing the letter row "ABCDE 12345" is a collecting mark 25 and a collecting mark model 25B is piled on a collecting mark 25A formed with unevenness on a surface of a tire. The collecting mark model 25B is a converted collecting mark model after the collecting mark model corresponding to the collecting mark 25 is subjected to a treatment of polar coordinate conversion and size conversion. Also, the position arranging the collecting mark model 25B is set based on the center position described in the mark arrangement information to the collecting mark model 25.

In order to specify a tire surface portion corresponding to the collecting mark model 25B, the search area 46 corresponding to the collecting mark 25 is set as an area widened by a difference $\Delta r_1$, $\Delta \theta_1$ previously determined with respect to a range of the collecting mark model 25B located at the center position described in the mark arrangement information of the collecting mark 25, and then the position of the surface portion corresponding to the collecting mark model 25B is changed in the same manner as the searching described on the mark 20 to calculate the coincidence every the position, whereby the surface portion having a highest coincidence is specified as a surface portion corresponding to the collecting mark model 25B. In FIG. 8(a), numeral 43 indicates the specified surface portion.

Further, the displacement between the collecting mark model 25B and the specified surface portion 43 is calculated, but such a displacement is ($\Delta x$, $\Delta y$) in case of FIG. 8(a).

FIG. 8(b) is a view explaining the treatment of the second step, in which the collecting mark model 25B is piled on the surface portion 43 corresponding to the collecting mark model 25B so as to match their centers with each other. In the second step, the search area corresponding to marks constituting the collecting mark 25 is set based on a modified mark arrangement information obtained by adding the displacement ($\Delta x$, $\Delta y$) to the mark arrangement information previously prepared, for example, to the mark 20. In FIG. 8(b), 22T is a mark model arranged based on the modified mark arrangement information after the addition of the displacement ($\Delta x$, $\Delta y$). It is sufficient to set the area widened by the difference $\Delta r_1$, $\Delta \theta_1$ previously determined with respect to a range of the mark model 22T as the search area 45A.

After the setting of the search area 45A to the mark 20, the surface portion corresponding to the mark model 22T can be specified in the search area 45A according to the aforementioned procedure.

When the search area 45A is set as mentioned above, the actual mark 20A can be caught in the search area in a higher probability without widening the search area 45A. On the other hand, as shown in FIG. 8(a), when the search area 45B is set based on only the mark arrangement information to the mark 20 without the first step, it can be seen that the probability of deviating the mark 20A from the search area 45B becomes high.

Next, the treatment of calculating the coincidence at (step 6) will be further described. In this case, the coincidence between the data of the three-dimensional form of the mark model and the specified surface portion 42B corresponding to the mark model 22 is calculated, but it may be preferable to use the second mark model 24 as a mark model used in this embodiment. FIG. 9(a) shows a surface portion 42B corresponding to the first mark model 22T after the conversion when a background pattern 28 is formed with unevenness around the mark 20A and when a part 27 of an adjoining mark is closed to the mark 20A, and FIG. 9(b) shows the first mark model 22T after the conversion. In this case, assuming that the coincidence between the mark model 22T and the surface portion 42B is calculated, the coincidence changes due to the difference between the presence and the absence in the pattern 28 and the part 27 of the adjoining mark irrespectively of the coincidence to the portion of only the mark 20, which becomes different from the expected coincidence.

In (step 6), therefore, it is preferable to calculate the coincidence by using the second mark model 24 shown in FIG. 5(c). In this case, the coincidence is only calculated with respect to the surface portion 44 corresponding to the second mark model 24T after the conversion, so that the coincidence only to substantially the mark portion can be determined, from which the lowering of the coincidence due to the presence or absence of the defect 23 can be known.

As the coincidence used in the calculation at this step can be used P(f, g) represented by the equation (1), which may be such an indicator that the numerical value is highest when these data are completely coincident with each other and the numerical value becomes low when these data are not coincident completely.

INDUSTRIAL APPLICABILITY

The invention can be used for inspecting the three-dimensional form of marks formed with unevenness on surfaces of various objects including a tire and recognizing the mark.

DESCRIPTION OF REFERENCE SYMBOLS 1 unevenness data acquiring means
2 mark data storing means
3 arithmetic processing means
4 result displaying means
5 control means for a whole of an apparatus
6 semiconductor laser
7 two-dimensional camera
8 driving device for rotation of tire
9 form data preparing device
10 inspection apparatus of tire uneven marks
11 mark model preparing device
10 sheet light
10 bright line
20 mark
20A mark formed on tire surface
20a inner portion of mark
20b profile line of mark
22 first mark model
22a band-shaped portion
22T converted mark model
23 defect of mark
24 second mark model
24a band-shaped portion
25 collecting mark
25B converted collecting mark model
27 part of adjoining mark
28 pattern
31 circular ring region
41 circular ring region
42, 42a, 42b tire surface portion corresponding to mark model
44 tire surface portion corresponding to mark model
45, 45A, 45B search area

The invention claimed is:

1. A method for inspecting three-dimensional forms of one or more marks formed with unevenness on a surface of a tire, which comprises a step of measuring heights of unevenness inclusive of these marks on each area element in a predetermined tire surface region to acquire data of unevenness distribution, a step of specifying a tire surface portion corresponding to a mark model for the respective mark in the tire surface region from data of three-dimensional form of a previously prepared mark model as a mark template and the acquired data of the unevenness distribution, a step of determining a coincidence between the data of the unevenness distribution and the data of the three-dimensional form of the mark model in the specified tire surface portion on the respective mark to judge an acceptance of the three-dimensional form of the respective mark based on the coincidence.

2. An inspection method of tire uneven marks according to claim 1, wherein the step of specifying the tire surface portion of the each mark corresponding to the mark model is carried out by setting a search area in the tire surface region based on a mark arranging information previously prepared to the mark, changing a position of the tire surface portion in the search area so as to correspond with the mark model and specifying the tire surface portion corresponding to the mark model to a position that a coincidence between data of unevenness distribution in the tire surface portion calculated every position and the data of the three-dimensional form of the mark model becomes highest.

3. An inspection method of tire uneven marks according to claim 1, wherein the step of specifying the tire surface portion of the each mark corresponding to the mark model comprises a first step wherein a pat of plural marks including the mark and marks adjacent thereto is a collecting mark and a tire surface portion corresponding to a collecting mark model previously prepared as a template of the collecting mark is specified from the tire surface region based on data of three-dimensional form of the collecting mark model and the acquired data of the unevenness distribution to determine a displacement between a position of the collecting mark based on an arranging information of the collecting mark previously prepared to the collecting mark and a position of the tire surface portion specified corresponding to the collecting mark model; and a second step wherein a search area to the mark is set based on a modified information of the mark arrangement obtained by adding the above displacement to the information of the mark arrangement previously prepared to the respective mark constituting the collecting mark and a position of a tire surface portion corresponding to the mark model is changed in the search area to specify the tire surface portion corresponding to the mark model to a position that a coincidence between data of unevenness distribution in the tire surface portion calculated every position and the data of the three-dimensional form of the mark model becomes highest.

4. An inspection method of tire uneven marks according to claim 1, wherein a mark model used in the step of specifying the tire surface portion of the each mark corresponding to the mark model is set as a region of a parallelogram including this mark.

5. An inspection method of tire uneven marks according to claim 1, wherein a mark model used in the step of judging the acceptance of the three-dimensional form of the mark is set as a zone including the mark and a band-shaped portion of a given width adjacent to an outside of the mark over a full length of a profile line of the mark.

6. An inspection method of tire uneven marks according to claim 1, wherein the data of the three-dimensional form of the mark model on the each mark are prepared based on CAD data of a mold forming the tire.

7. An inspection method of tire uneven marks according to claim 1, wherein the data of the unevenness distribution is acquired by using a light cutting process at the step of measuring the heights of the unevenness on each area element in the predetermined tire surface region.

8. An inspection apparatus of tire uneven marks used in an inspection method of tire uneven marks as claimed in claim 1, comprising an unevenness data acquiring means for measuring the heights of the unevenness to acquire data of unevenness distribution, a mark data storing means for storing the mark arranging information to the each mark and data of three-dimensional form of the mark model, an arithmetic processing means for specifying a tire surface portion corresponding to the mark model based on the data of the unevenness distribution input from the unevenness data acquiring means and the data of the three-dimensional form of the mark model input from the mark data storing means to judge an acceptance of the three-dimensional form of the mark based on a coincidence between the data of the three-dimensional form in the specified tire surface portion and the data of the three-dimensional form of the mark model, and a result displaying means for outputting a judging result of the acceptance.

* * * * *